(12) United States Patent
Newbould

(10) Patent No.: US 7,484,098 B2
(45) Date of Patent: Jan. 27, 2009

(54) DATA NON REPUDIATION

(75) Inventor: Richard E Newbould, Ipswich (GB)

(73) Assignee: British Telecommunications public limited company, London (GB)

( * ) Notice: Subject to any disclaimer, the term of this patent is extended or adjusted under 35 U.S.C. 154(b) by 745 days.

(21) Appl. No.: 10/471,661

(22) PCT Filed: Mar. 5, 2002

(86) PCT No.: PCT/GB02/00938

§ 371 (c)(1),
(2), (4) Date: Sep. 12, 2003

(87) PCT Pub. No.: WO02/080450

PCT Pub. Date: Oct. 10, 2002

(65) Prior Publication Data

US 2004/0078567 A1    Apr. 22, 2004

(30) Foreign Application Priority Data

Mar. 30, 2001   (EP) .................................. 01303075

(51) Int. Cl.
*H04L 9/32* (2006.01)
(52) U.S. Cl. ..................................................... 713/176
(58) Field of Classification Search ................... 713/176
See application file for complete search history.

(56) References Cited

U.S. PATENT DOCUMENTS 5,790,669 A * 8/1998 Miller et al. ................... 705/80

OTHER PUBLICATIONS

Markowitch et al., Probabilistic Non-Repudiation Without Trusted Third Party, 1999, Universite Libre de Bruxelles, pp. 1-12.*
Perrig et al, "Efficient Authentication and Signing of Multicast Streams over Lossy Channels", Proceedings of the 2000 IEEE Symposium on Security and Privacy, S&P 2000, Berkeley, CA, May 14-17, 2000, Proceedings of the IEEE Symposium on Security and Privacy Lost Alamitos, CA: IEEE Comp. Soc. US, May 14, 2000, pp. 56-73, XP000964041.

* cited by examiner

*Primary Examiner*—Kambiz Zand
*Assistant Examiner*—William S Powers
(74) *Attorney, Agent, or Firm*—Nixon & Vanderhye P.C.

(57) ABSTRACT

Non-repudiation of two-party data is provided by operating a terminal to provide non-repudiation in respect of data exchanged between the terminal and at least one other terminal. The data is exchanged via a link operable to provide a first link mode in which at least a portion of the exchanged data may be lost. The process involves: (a) determining which data sent from the terminal was received at the other terminal; (b) indicating to the other terminal, which data sent from the other terminal was received at the terminal; (c) receiving a digital signature from the other terminal; and (d) in the event that the terminal determines that the digital signature was created utilizing a private cryptographic key associated with the other terminal and data including both the determined data and the indicated data, establishing non-repudiation in respect thereof.

14 Claims, 9 Drawing Sheets

| | 102 | | | |
|---|---|---|---|---|

FIGURE 4E

| 1 | 101 | 2 | 3 | 103 | 104 | 5 | 105 |
|---|---|---|---|---|---|---|---|

FIGURE 4F

| 1 | AUDIO DATA (1) | 101 | AUDIO DATA (101) | 2 | ........... |
|---|---|---|---|---|---|

FIGURE 4G

DATA NON REPUDIATION

This application is the U.S. national phase of international application PCT/GB02/00938 filed 5 Mar. 2002 which designated the U.S.

BACKGROUND

1. Technical Data

The present invention relates to a method of and apparatus for data non-repudiation.

2. Related Art

An abiding concern in the history of communication techniques is the worry that messages or conversations, whilst purporting to come from or be with a particular party might in fact have been made up by another (malicious) party.

Various methods to attempt to raise the level of trust that parties may place in messages or conversations have been introduced, many of them relying on cryptographic techniques. It is certain that, at least as far as the public domain is concerned, cryptographic techniques have themselves been developing apace over the last few decades, leading to the widespread introduction of such technologies as public key encryption, digital signatures and public key infrastructures as now provide for the much vaunted e-commerce revolution.

In terms of the sending of messages, the notion of so-called 'non-repudiation' may embrace both that a message originator is unable to deny either having created the contents of a message or having sent the message and that a message recipient cannot deny having received the message (i.e. non-repudiation of both transmission and receipt).

Cryptographic techniques have been used to address the problem of non-repudiation and related problems such as authentication (providing for a guarantee of message originator identity), confidentiality (providing for a guarantee that the message has not been intercepted and read during transmission) and integrity (providing for a guarantee that the message can only be changed by an authorised party).

Further definitions may be found for "non-repudiation" and associated terms in, for example, Internet Engineering Task Force (IETF) Request For Comments (RFC) 2828, "Internet Security Glossary".

A thorough discussion of cryptographic techniques and applications is to be found in "Applied Cryptography", Bruce Schneier, Wiley 1996.

A typical cryptographic approach to providing non-repudiation of, for example, transmission of a message has first involved the formation of a so-called message digest or hash of the message and then signing of the hash with a key. The hashing step tends to account for only a small portion of the time taken in such approaches whereas the signing step tends to account for a large portion, being much more slow. For non real-time operations, the slowness of this step may be of no significance. For applications which have a (near) real-time operation however, the slowness engendered by the signing of messages may well be intolerable.

An application might, for example, produce a stream of messages each carrying data such as a portion of a voice conversation between two parties. Non-repudiation of both transmission and receipt would be desirable to provide for the possibility of proof of who had said what in the conversation and who had heard it. These voice messages may suitably be carried in the form of so-called packets. For an introduction to packet protocols see, for example, "Internet Core Protocols", Eric A. Hall, O'Reilly publishers, 2000.

Internet Protocol version 4 (IPv4) is in widespread use on computer networks at the present time. IP was originally intended for asynchronous data transport rather than real time media sessions. IP itself provides no guarantees as to packet delay, ordering or even arrival. Higher level protocols have been developed for use over an IP layer. The Transmission Control Protocol (TCP; hence the TCP/IP protocol suite) is a connection oriented service, with which the unreliability associated with IP is managed through the use of acknowledgements to confirm packet arrival (and to re-send where necessary). TCP/IP is not of general use for carrying the data of real time applications since it can introduce intolerable delays occasioned by waiting for lost packets to be re-sent. By way of contrast, the User Datagram Protocol (UDP; hence the UDP/IP protocol suite) is a connectionless service which is therefore more suitable for real time applications in that it does not hold up transmission of a sequence of packets if one of the packets in the sequence is lost.

By way of conversion into a suitable form for packetisation, an analogue signal such as speech can be digitised (including a degree of compression) using techniques such as Pulse Code Modulation (PCM; an 8 bit code converting speech into a 64 kbps stream), Adaptive Differential Pulse Code Modulation (ADPCM; a 4 bit code converting speech into a 32 kbps stream) or Linear Predictive Coding (utilising a model of human speech).

Whilst bandwidth efficient, this digitisation process introduces a delay which may add to other sources of delay arising from sending a packet over a network such as propagation delay (rather small transmission time on hops between network nodes) and handling delay (rather larger time taken in network nodes incurred by such processes as buffering). By way of example, a one way delay of some 100 milliseconds might be introduced in this way.

Rather more serious however than even this absolute delay (with which conversation can still be carried out by making some concessions to the need for parties to speak in turn) is the introduction of a variable delay through packet transport mechanisms. A variable delay or so-called 'jitter', between, for example, syllables, can cause severe difficulties in understanding speech. Techniques have therefore been developed to buffer the received audio data carrying packets. Thus, no matter what jitter has been suffered in the receipt of the buffered packets, the audio data contained within can be played out of the packet buffer at an acceptable constant rate. Whilst smoothing the variable delay, this clearly introduces a further element of absolute end-to-end delay. If a packet arrives outside an acceptable buffer period, instead of holding up the playout, it is generally discarded.

Accordingly, to provide a mechanism for non-repudiation of both transmission and receipt in such a field of application would require the addressing of the issue that the signing of each message may well add an intolerable delay to the cumulative delays already arising from the message network transport. If, as is likely for the reasons indicated above, an unreliable packet protocol is used, the issue of the occasional loss of a message must also be addressed.

The following method might be considered for application to this class of non-repudiation problems:

Gennaro and Rohatgi ("How to sign digital streams", Crypto '97, pp180-197) proposed a scheme for signing a real-time digital stream wherewith the stream is broken into blocks and authentication information is transmitted with each. Packet/is then authenticated by a public key contained in packet/−1 using a fast 1-time signature scheme. If the first packet is authenticated using standard public key cryptography then the whole stream is signed. Whilst faster (using a hash computation based 1-time scheme) problems arise with the overhead incurred by each packet containing the public key for the next and a signature of itself and the fact that authentication cannot continue if a packet is dropped.

Neither the straightforward hashing and signing of every packet nor the proposed alternative method present a solution to the identified problems.

BRIEF SUMMARY

According to one aspect of the present invention however there is provided a method of operating a terminal to provide non-repudiation in respect of data exchanged between the terminal and at least one other terminal, the data exchanged via a link operable to provide a first link mode in which at least a portion of the exchanged data may be lost, the method comprising the steps of: (a) determining which data sent from the terminal was received at the other terminal; (b) indicating to the other terminal, which data sent from the other terminal was received at the terminal; (c) receiving a digital signature from the other terminal; and (d) in the event that the terminal determines that the digital signature was created utilising a private cryptographic key associated with the other terminal and data comprising both the determined data and the indicated data, establishing non-repudiation in respect thereof.

In this way, advantageously, the method of providing for non-repudiation according to the invention addresses both the problems of the occasional loss of packets (a given common block of data is agreed between the terminals before going to the trouble of signing packets that may then be lost) and the time delay (rather than signing every packet before transmission, again, only the agreed, received data, is signed). In effect, unlike the methods of the prior art which inextricably link the packets carrying the session data and the signing process, the invention provides for a separation of the session (allowing the packets to be carried without signing delay) and the non-repudiation (carried out on a different timescale with stored copies of the relevant portions of data).

Preferably, in step (d), the terminal performs the determination through the steps of: performing a hash function on the data comprising both the determined data and the indicated data to create a first hash value; decrypting the digital signature with a public cryptographic key associated with the other terminal to obtain a second hash value; and in the event that the first hash value and the second hash value are identical, determining that the digital signature was created utilising a private cryptographic key associated with the other terminal and data comprising both the determined data and the indicated data.

In this way, advantageously, only the (relatively small) (encrypted) hash values of the relevant portions of the exchanged data need pass between the terminals, reducing data transmission overhead whilst still providing for the necessary degree of proof of identity and data presence at both terminals for the purposes of non-repudiation.

The method according to the invention may be performed simultaneously by two or more such terminals in respect of each other thus advantageously providing for the possibility of non-repudiability as between the two or more terminal participants in a session.

The method according to the invention may typically be used to provide non-repudiation in respect of a datastream exchanged between at least two terminals thorugh repetition of the above steps in respect of successive portions of the datastream.

Once such non-repudiable data has been established by the relevant one or more parties the non-repudiable data can then be archived for use in future proof related matters relating to the session.

Commensurate Apparatus is also Provided.

BRIEF DESCRIPTION OF THE DRAWINGS

One or more embodiments of the invention will now be described, presented by way of example only, and having regard to the accompanying drawings in which:

FIGS. 4A to 4G illustrate aspects of data block composition according to one embodiment of the invention.

DETAILED DESCRIPTION OF EXEMPLARY EMBODIMENTS

Figure 1:
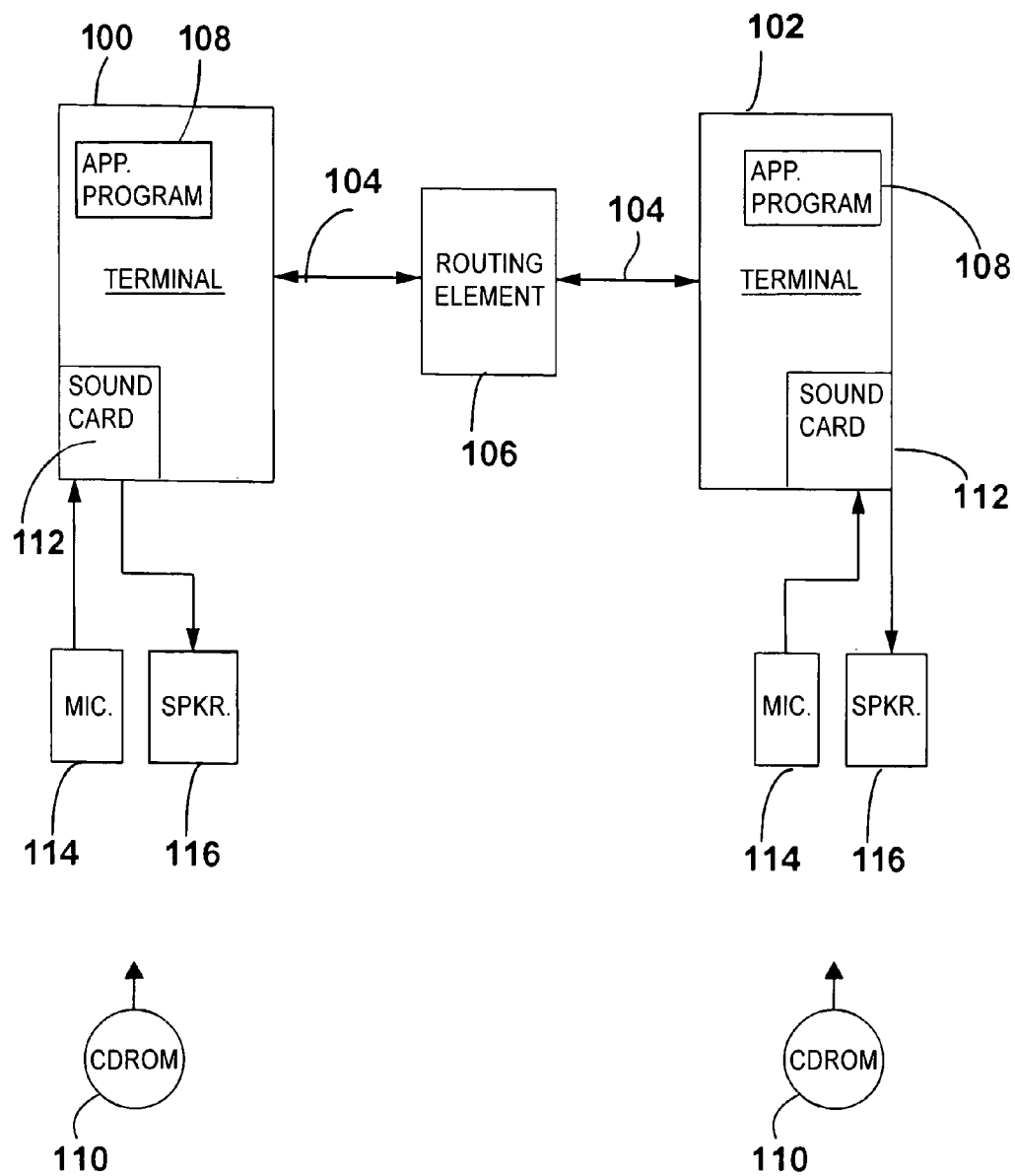
FIG. 1 represents a schematic view of a communication arrangement suitable for use with the invention.

FIG. 1 illustrates a schematic view of a communication arrangement suitable for use with the invention. A first terminal 100 is joined with a second terminal 102 by means of a network link 104 as to permit communication between a first party located at the first terminal 100 and a second party located at the second terminal 102.

A number of packet based protocols are utilised for this communication. In particular, the Internet Protocol (IP) is utilised along with the User Datagram Protocol (UDP) and the Transmission Control Protocol (TCP) as discussed in the introduction. In this embodiment real-time voice based communication between the users of the terminals is effected utilising UDP/IP. Accordingly, the terminals 100, 102 provide functionality such that in this example, audible speech at one terminal can be converted into a UDP/IP packetised form for transmission over the link 104 and that when received at the other terminal, the speech in this form can be converted back into audible speech. A second type of packet based communication, effected utilising TCP/IP, also takes place between the terminals.

The link 104 includes a routing element 106 for routing packets from the first terminal to the second terminal and vice versa.

The arrangement of the first terminal 100 will now be described but it is to be understood that the second terminal 102 is arranged in the same manner (and as are illustrated in FIG. 1 with a primed notation).

The first terminal 100 may suitably be a general purpose computer. As is typical, the first terminal is provided (not all shown in FIG. 1) with a CPU, ROM, RAM, at least one storage device such as a hard disk, a computer storage media reading device such as a floppy disk, CD-ROM or DVD-ROM reader, network input and output ports and an operating system with a suitable network communications stack. Discussion of suitable port and socket arrangements for UDP can be found, for example, in Chapter 6, pages 250-267, of "Internet Core Protocols", Eric A. Hall, O'Reilly publishers, 2000. Discussion of suitable port and socket arrangements for TCP can be found, for example, in Chapter 7, pages 268-398, of "Internet Core Protocols", Eric A. Hall, O'Reilly publishers, 2000.

Further, the first terminal 100 runs an application program 108 which causes the execution of the steps of the flowcharts of FIGS. 2 and 3. This application program 108 may be loaded into the terminal from a suitable computer readable storage media (e.g. a CDROM 110) on which the application program is stored. Alternatively the application program may be downloaded onto the terminal over the network 104. By way of alternative to loading the application programs, the terminals might be provided with the above functionality through dedicated hardware.

The first terminal 100 is provided with a soundcard 112 with which an audio input from a microphone 114, such as the speech of the first party, can be converted in a digital bit stream accessible to the application program 108 (utilising a suitable analogue to digital conversion algorithm as discussed above). Commensurately, such a digital bit stream can also be converted back into audio output through a speaker 116 (utilising a suitable digital to analogue conversion algorithm).

As indicated above, one means of dealing with the network jitter problem is to store audio data packets (received from another terminal over the network) in a buffer (for example, established in RAM) such that they can then be played out in sequence (albeit with an additional delay). Packets received outside the appropriate buffer period are discarded. Upon playing out these packets from the buffer, the audio data contained therein is then extracted, converted into a digital bitstream and passed to the soundcard. The soundcard 112 then converts this bitstream into audible speech from the speaker 116, such that, in this example, the first party could hear what another party is saying.

The operation of the first embodiment of the invention will now be illustrated Having regard to FIGS. 2A-B, 3A-D and 4A-G.

As will become clear, in operation, a number of processes take place in parallel. In particular processes relating to the voice communication take place in parallel with processes relating to the non-repudiation. The voice communication processes will be discussed having regard to FIGS. 2A-B. The non-repudiation processes will be discussed having regard to FIGS. 3A-D and 4A-G. It will be appreciated that certain steps illustrated in the flowcharts of FIGS. 2A-B and 3A-D can be carried out in a different order to that illustrated without alteration of functionality.

A first party and a second party desire to have voice communication via a network. Accordingly, the first application program is invoked on the first terminal by the first party. If the first terminal utilises a Graphical User Interface (GUI), for example, an icon representing the application program 108 could be double-clicked with a mouse button. The second application program 108 will be similarly invoked on the second terminal 102 by the second party.

A process of session setup to allow the voice communication will then take place. Such a setup process involves a number of conventional steps which need not be discussed further, and additional steps for the purposes of the invention which will be discussed further below.

The voice communication will be dealt with first. The first party speaks into the first microphone 114 and as discussed above, the soundcard 112 converts this speech into a stream of data.

Figure 2A:
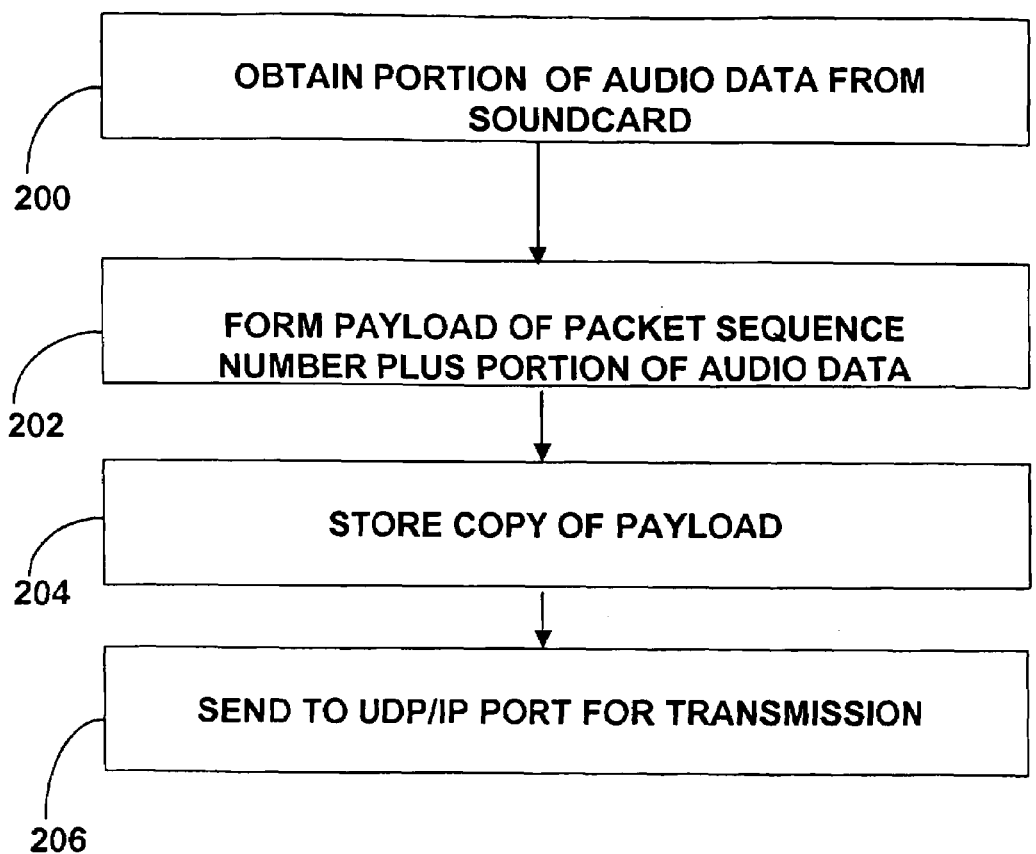
FIGS. 2A and 2B illustrate a flowchart depicting the steps of a voice communication session according to one embodiment of the invention.

Having regard to FIG. 2A, in a first step 200, the application program 108 obtains a portion of data from the soundcard.

Figure 4A:

In a second step 202, the application program concatenates the portion of data and a packet sequence identification number to create the payload of a UDP/IP packet payload, as illustrated in FIG. 4A. A further timestamp may be included. So long as the packet sequence identification numbers increment appropriately for every new packet, the initial packet sequence identification number can be chosen at will. Examples of such packet sequence identification numbers will be illustrated further below.

In a third step 204 a copy of the portion of data and associated packet sequence identification number are stored (e.g. either in the terminal RAM 107 or written to a file on the terminal storage device) in the first terminal 100 for later use.

In a fourth step 206, an appropriate UDP/IP header (including, for example, the IP addresses of the first and second terminals) is associated with this payload and the UDP/IP packet is sent from a suitable port for transmission over the network 104 to the second terminal 102.

The second terminal 102 will be carrying out an equivalent sequence of steps with the audio data corresponding to the speech of the second party, with effect that the first terminal 100 will also receive on a suitable port a series of such UDP/IP packets from the second terminal.

It will be recalled that, for the purposes of avoiding the network jitter problem as discussed above, each such received packet is stored in a buffer (established, for example, in the terminal RAM 107).

Figure 2B:
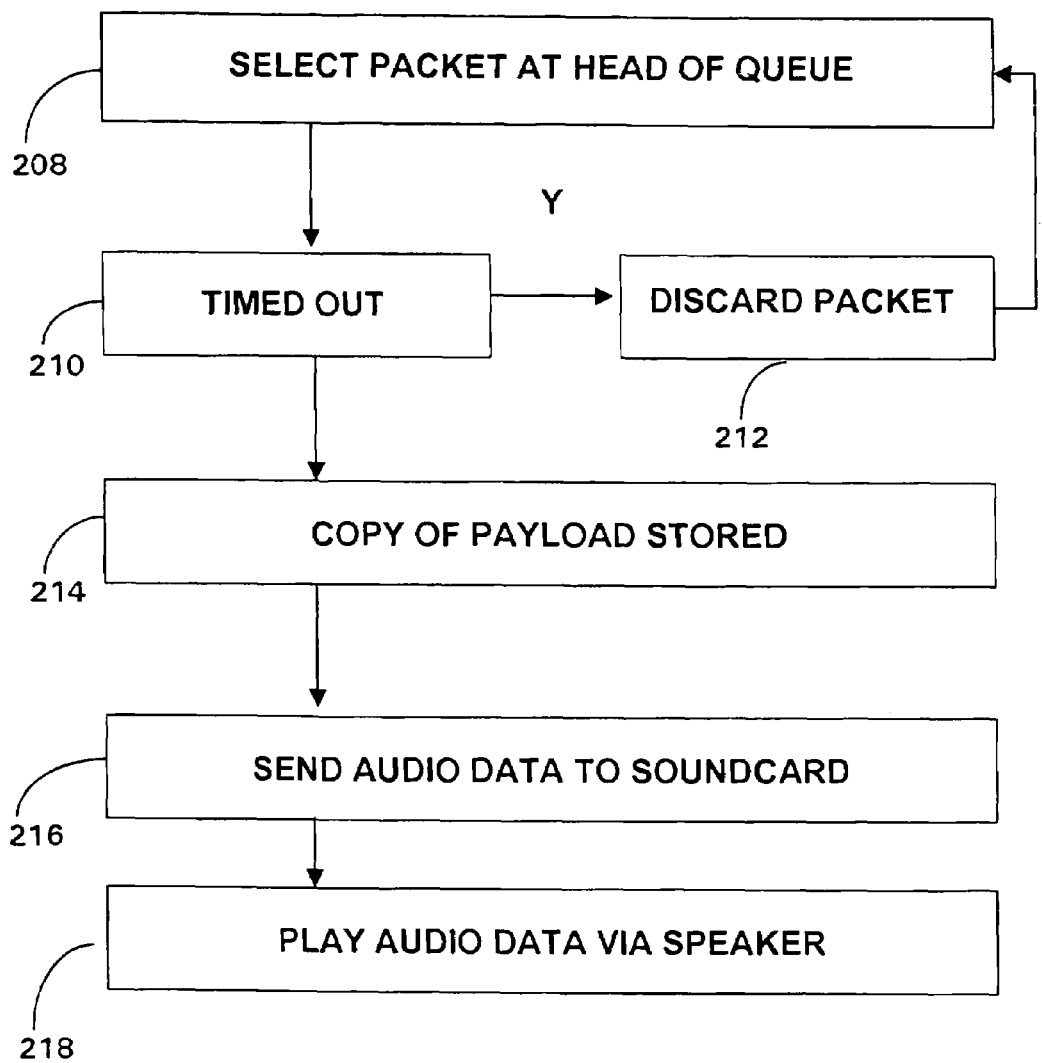

Having received such audio data bearing packets, the audio data is converted back to audible speech as will now be discussed having regard to FIG. 2B.

In a first step 208, the packet at the head of the input buffer queue is selected by the application program 108. In a second step 210, this packet is then tested for a time-out condition.

One suitable mechanism for this testing of time out, since the packets will be read out from the buffer at a constant rate and thus the playout holdup time necessary to insert an out of sequence packet correlates directly with the packet sequence numbers included in the packets, is to test each successive packet sequence identification number against the previously read packet sequence identification numbers. If, for example, a given packet was found to be n or more places out of sequence, then that packet could be discarded. By way of simple example, if a sequence of packets were read out with identification numbers "20", "21", "22", "15", "23", the pattern established by the first three packet sequence numbers indicates that packet "15" is likely very late being seven slots out of order. Packet playout would have to be held up for a time period corresponding to seven times the period required to read a single packet out of the buffer so that "15" could be inserted between "14" and "16" and the seamless "14" onward stream then played out. According to the simple rule, if n=5 (bounding the maximum delay component from this buffering in hearing the speech of the other party to five times the period required to read a single packet out of the buffer), then packet "15" must be discarded.

A conventional timestamping approach might also be employed.

As discussed, a packet is to be automatically discarded if outside the buffer period i.e. the jitter associated with that packet is too great. If the packet is deemed to have been timed-out then, in a third step 212, this packet is discarded and the process returns to first step 208.

If the packet has not timed-out however, in a fourth step 214, a copy of the audio data and associated packet identification number are stored (e.g. either in the terminal RAM or written to a file on the terminal storage device) for later use. In a fifth step 216 the audio data from the packet payload is sent to the soundcard 112. In a sixth step 218, the soundcard 112 then converts this audio data to audible speech via the speaker 116, such that the first party can hear the corresponding portion of audible speech from the second party. Naturally, a stream of such packets will be received and the corresponding audio data portions sent to the soundcard will form a bitstream providing for continuous speech.

In this way, the first and second parties will be able to carry on a continuous two-way voice conversation.

As need not be discussed further, the application program 108 will continue during this session to monitor for such events as a session termination instruction, which again, might be indicated through the selection of an appropriate icon in a GUI interface.

Further to the first and second parties having voice communication via the network, this embodiment of the invention provides for the continuous assurance of non-repudiation, as will now be discussed having regard to FIGS. 3A to 3D.

Further to the conventional session setup operations indicated above, an additional three setup steps (necessary for the non-repudiation operations) take place during setup.

Figure 3A:
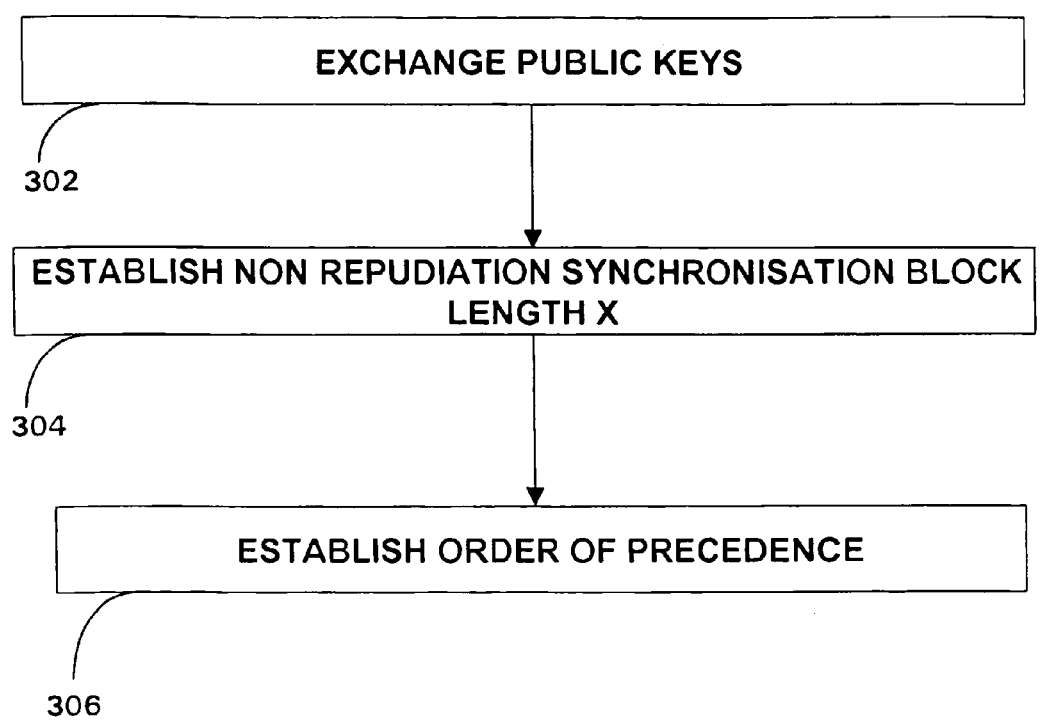
FIGS. 3A to 3D illustrate a flowchart of a non-repudiation process according to one embodiment of the invention.

Having regard to FIG. 3A, in a first additional step 302, the first and second application programs carry out a public key exchange (since each terminal will have subsequent need of the public key associated with the other). This exchange can take place in accordance with a typical three phase handshake. It will be appreciated that each terminal will have a private key corresponding to these public keys (stored for example in terminal RAM 107).

More generally, these public and private key pairs may be associated with, for example, the user of the terminal, rather than the terminal itself. In this case, the user of the terminal will make available to the terminal the appropriate key pair through, for example, the introduction of a smartcard containing the appropriate key pair belonging to the user into an appropriate smartcard port in the terminal such that the application program can access the key pair.

If the terminals already possess the appropriate public keys of the other parties, then the step of exchange need not be carried out.

For detailed discussion of appropriate key exchange techniques, see, for example, "Key-Exchange Algorithms", Chapter 22 of "Applied Cryptography", Bruce Schneier, Wiley 1996. For further discussion of public key infrastructures and, for example, digital certificates, see, for example, Part III, pages 99-184, "Digital Certificates", "Web Security and Commerce", Simson Garfinkel and Gene Spafford, O'Reilly Publishers, 1997.

In a second additional step 304, the first and second application programs establish a non-repudiation synchronisation block length, X. This block length, X, indicates how many packets are to be received before another non-repudiation synchronisation event has to take place, as will be discussed further below.

In a third additional step 306, the first and second application programs establish an agreed 'order of precedence', as will be discussed further below.

Figure 3B:
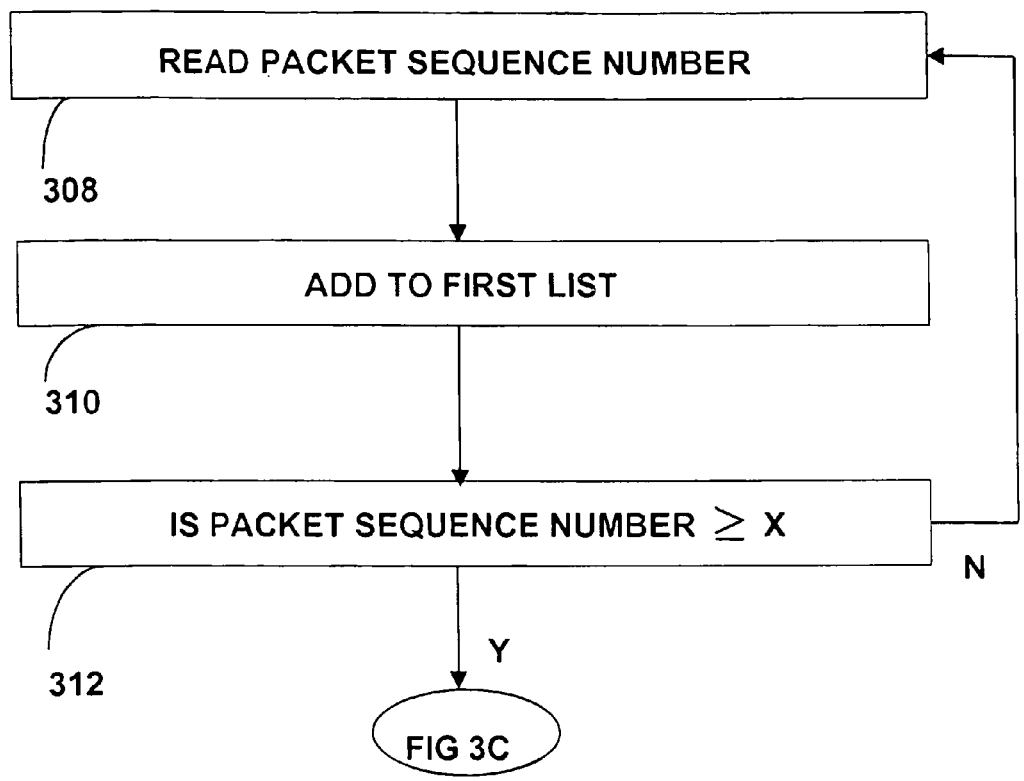

Once setup has been completed, during the course of and in parallel to the voice communication session, periodic non-repudiation messages are exchanged as will now be discussed having regard to FIG. 3B.

In a first step 308, the packet identification number written into the packet payload of each packet whose audio data has just been played out (i.e. a "no" response to third step 210 having regard to the operation of the first terminal) is read by the first application program. The packets, it will be appreciated, will necessarily be played out from the buffer in order but, potentially, with some packets missing from the sequence.

In a second step 310, this packet identification number is added to a first list.

It will be recalled that a non-repudiation synchronisation block length, X, was established during initialisation indicating how many packets are to be received before another non-repudiation synchronisation event has to take place.

Accordingly, in a third step 312, the first application program tests whether this last read packet identification number is either equal to X or greater than X (in the case where packet X might have been dropped). It is to be noted that, since this process is to occur periodically, more generally the first application program waits until the latest packet identification number read from a packet is a multiple of X, i.e. (number) mod X is greater than or equal to zero. In the event that the packet identification numbering sequence does not begin at one, the relevant computation will provide for an appropriate comparison of, for example (X−1) with a subtraction of the latest played out identification number minus the first played out identification number, so as again to ensure that the non-repudiation operation is performed in respect of every X packets.

If the condition in the third step 312 is false, then the process returns to the first step 308 and another packet identification number is read.

Accordingly, the first list so generated contains the packet sequence identification numbers corresponding to the audio data which was played out at the first terminal during that corresponding time period.

Figure 4B:
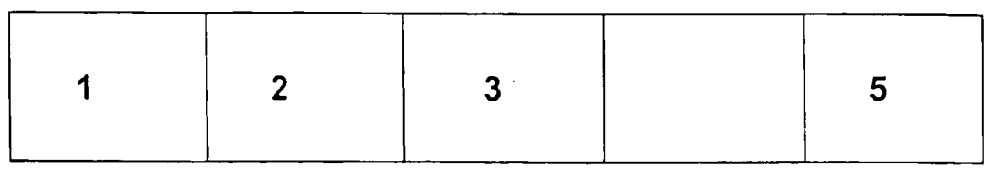

Having regard to FIG. 4B, in a simple example, denoting the first terminal packet sequence identification number as beginning with a "1" and incrementing in single units, a sequence of five packets is to be considered of which only four, "1", "2", "3" and "5", have been played out at the first terminal.

Figure 3C:
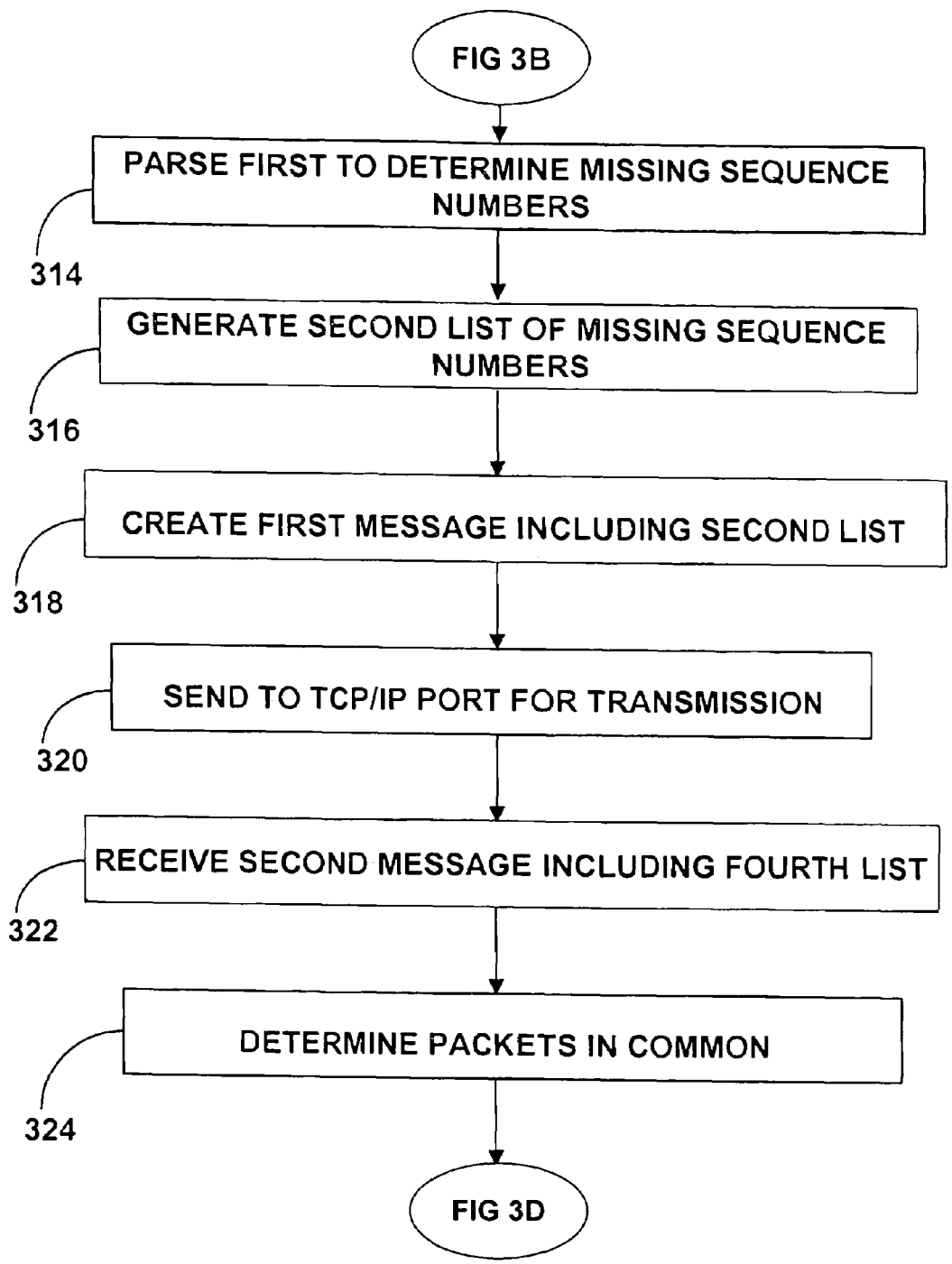
Figure 3D:
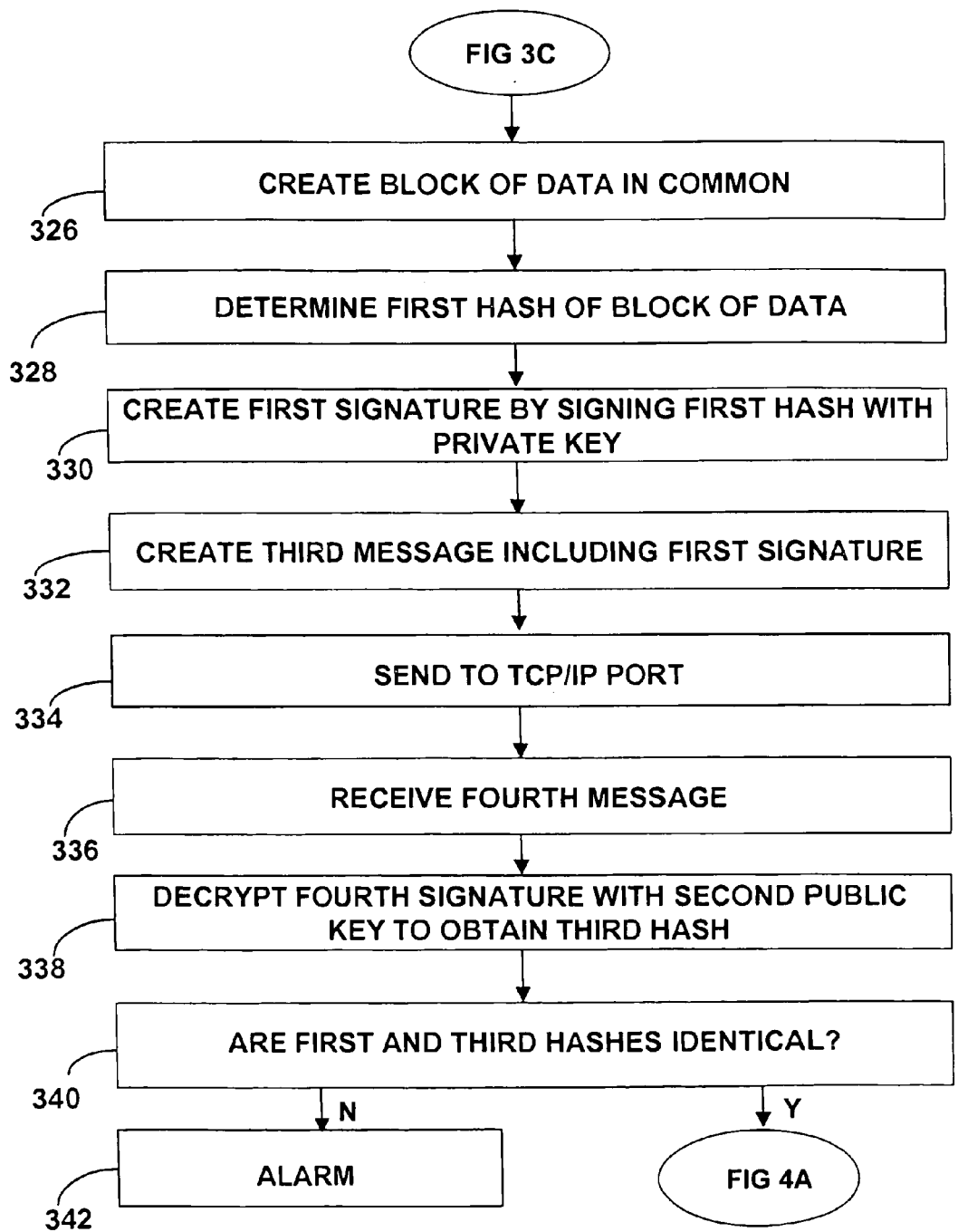

When the condition in the third step 312 is true, having regard to FIG. 3C, in a fourth step 314, the first application program parses this first list to determine which packet identification numbers are missing.

In a fifth step 316, a second list of packet identification numbers corresponding to audio data which was not played out at the first terminal is thereby generated.

Figure 4C:
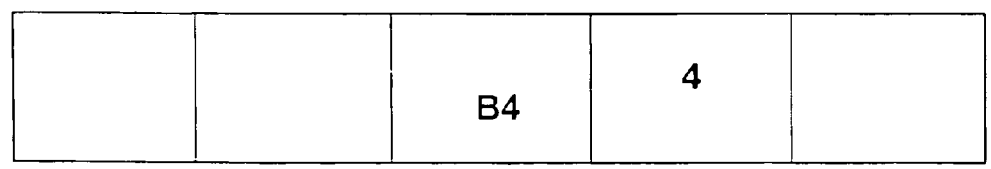

Having regard to FIG. 4C, in this simple example, this list comprises only "4".

A message is now to be generated including this second list as a payload for sending to the second terminal. This message, unlike the near real time voice data sent using UDP/IP, is instead more suitably sent using TCP/IP since it is not so critically time dependent and must be sent reliably.

In a sixth step 318 therefore, an appropriate TCP/IP header (including, for example, the IP addresses of the first and second terminals) is associated with this payload and in a seventh step 320, the TCP/IP packet is sent from a suitable port for transmission over the network to the second terminal.

It will be appreciated that the second application program running on the second terminal will likewise create an equivalent third and fourth list (this fourth list providing the packet sequence identification numbers corresponding to audio data which was not played out at the second terminal) and will likewise send the fourth list as the payload of a second TCP/IP non-repudiation message to the first terminal.

Figure 4D:
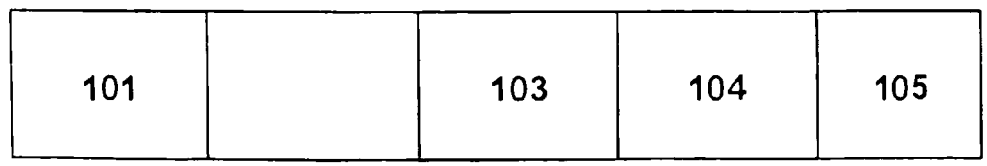

Having regard to FIGS. 4D and 4E, in this simple example, denoting the second terminal packet sequence identification number as beginning with a "101" and incrementing in single units, this third list comprises "101", "103", "104" and "105", and accordingly, the fourth list comprises only "102".

In an eighth step 322, the first application program receives this second non-repudiation message from the second terminal on a suitable port. In a ninth step 324, the first application program determines, on the basis of the second list (which packets were not played out by the first application program) and the fourth list (which packets were not played out by the second application program), which packets in the respective sequence orders both the first application program and the second application program have played out to the respective users in common.

Having regard to FIG. 4F, in this simple example, this set of packets comprises "1", "2", "3", "5", "101", "103", "104" and "105".

Again, the second application program will likewise make such a determination of which packets in the respective sequence orders both the second application program and the first application program have played out in common.

It will be appreciated that whilst the lists of packets that were played out, i.e. the first and third lists, could have been exchanged by the first and second terminals to allow the same determination, hopefully, the lists of packets not played out will be shorter, making for correspondingly shorter packet payloads.

In a tenth step 326, the first application program retrieves from storage (either From the terminal RAM or from the appropriate storage device) the appropriate portions of audio data corresponding to those packet identification numbers in the common list determined in the ninth step and creates therewith a first data block, illustrated in FIG. 4G as comprising the requisite packet identification and audio data pairs. The composition of the data block might take different forms, for example, where the respective first and second terminal packet identification sequence numbers are identical, the data block might comprise the requisite packet identification numbers, the corresponding data sent from the first terminal with those numbers and then the corresponding data sent from the second terminal with those numbers. The second application program likewise creates a second data block.

It was noted above that, whatever their particular composition, it is important that both the first and second blocks of data formed by the respective first and second application programs have the same data order. It was for this reason that an agreed 'order of precedence' was established during session initialisation. Given that the first application program and the second application program will have agreed on both how the data block is to be ordered (during the third step 306 of FIG. 3A on session initialisation) and the contents of this data block (in the ninth step 324 of FIG. 3C), the resultant data blocks formed by the first application program and the second application program should be exactly the same.

The theory and practice of hash functions such as Message Digest 5 (MD5) or Secure Hash Algorithm (SHA) are well known. For detailed discussion of appropriate techniques, see, for example, "One-way Hash Functions", Chapter 18 of "Applied Cryptography", Bruce Schneier, Wiley 1996.

In an eleventh step 328, utilising such an appropriate hash function as MD5 or SHA the first application program determines and stores a first hash value of this first data block. The second application program will likewise do the same for a second hash value in respect of the second data block.

If the ordered contents of the respective data blocks were exactly the same, then the respectively determined hashes of the data blocks will be exactly the same. It will be appreciated that if the 'order of precedence' had not been agreed, and if the second application had, for example, stored elements where the data from the second terminal preceded instead of followed that from the first terminal, then, even though the data block contents were the same, the hashes would have differed.

The theory and practice of public key digital signatures such as the Digital Signature Algorithm (DSA) are well known. For detailed discussion of appropriate techniques, see, for example, "Public-Key Digital Signature Algorithms", Chapter 20 of "Applied Cryptography", Bruce Schneier, Wiley 1996.

In a twelfth step 330, utilising an appropriate algorithm such as DSA, the first application program signs the first hash with the private key associated with the first application program to create a first digital signature. The second application program likewise signs the second hash with the private key associated with the second application program to create a second digital signature.

In a thirteenth step 332, the first application program creates a third TCP/IP nonrepudiation message including the first digital signature as a payload and in a fourteenth step 334 sends this message to a suitable port for transmission to the second terminal.

The second application program will likewise have created and sent a fourth TCP/IP non-repudiation message including the corresponding second digital signature. In a fifteenth step 336, the first application program receives at a suitable port of this fourth message from the second application program.

During the first session initialization step, discussed having regard to FIGS. 3A-D, the respective first and second application programs exchanged respective public keys.

Following receipt of the TCP/IP fourth message, in a sixteenth step 338, the first application program will attempt to decrypt the payload of the fourth message, which is to say the second digital signature, using the public key associated with the second application program. If the public key is indeed the matched key for the private key with which the second application program should have created the second digital signature, the result of this operation should produce a hash which is the same as the second hash.

In a seventeenth step 340 this third hash produced by decrypting the second digital signature, is compared with the stored first hash.

If the third hash and the first hash are not identical then either the two terminals have a different view as to the audio data that was both transmitted and received by each (in which case the contents of the conversation cannot be proved) or a private key was used to sign which does not correspond with the public key (in which case the identity of the party in question cannot be proved).

In either case, for that block of the conversation, 'non-repudiation' cannot be assured and, in an eighteenth step 342 a warning of such is provided which might include, for example, a prompt to terminate the conversation.

If the third hash and the first hash are identical however, then, the first terminal (or perhaps rather, the user of the first terminal) can be assured that, not only does the other terminal have the same view as to the conversation that has just taken place during this segment (i.e. the matching of the hash values indicates that the first terminal is assured that the second terminal used (and therefore possessed) exactly the same data in the making of the hash) but that also the other terminal must have used the private key associated with the public key that the first terminal used to decrypt the digital signature and thereby obtain the hash value (i.e. the first terminal establishes the identity of the other terminal (or perhaps rather, the user of the other terminal) to the extent that the public and private key association can provide for).

Likewise, if the second terminal carries out the same comparison of the fourth and second hashes (having likewise used the appropriate public key associated with the first terminal to decrypt the digital signature likewise sent by the first terminal) and finds them to be identical, then it too can be assured of the non-repudiation of this portion of the session as to both the exchanged data and the identity of the other party.

In this way, 'non-repudiation' (introduced above in terms of an identified message originator being unable to deny either having created the contents of a message or having sent the message and that an identified message recipient cannot deny having received the message) will have been assured for both parties for that block of the conversation.

As indicated above, unlike the prior art, the method of providing for non-repudiation according to the invention addresses both the problems of the occasional loss of packets (a given common block of data is agreed between the participants before going to the trouble of signing packets that may then be lost) and the time delay (rather than signing every packet, again, only the agreed, received data, is signed). In effect, rather than the methods of the prior art which inextricably link the packets carrying the session data and the signing process, the invention provides for a separation of the session (allowing the packets to be carried without signing delay) and the non-repudiation (carried out on a different timescale with stored copies of the relevant portions of data).

Following establishment of non-repudiation in respect of this block of the conversation, the steps of FIGS. 3A-D are then repeated continually for as long as the session lasts (or until a non-repudiation alarm is given in step 342) providing for ongoing assurance of non-repudiation.

Further, in parallel, if 'non-repudiation' were assured then the application program can also proceed to archive the relevant block information.

The archived data file might include, for example, a timestamp indicating the start time of the conference, the parties X.509 certificates, X (the non-repudiation block length), the order of precedence indicator, an audio compression scheme identification and appropriate parameters and then the numbered audio data blocks with the associated digital signatures. In this way the archive can be consulted at a later date for the purposes of demonstrating the non-repudiability of the session record.

It is to be noted that, apart from the connectionless data network of this example, more generally, packet voice can equally well be carried over a variety of different network types including synchronous circuit switched networks and frame or cell networks.

It will be appreciated that the invention might be embodied in a number of alternative packet protocols, so long as they provide the same functionality as do UDP/IP and TCP/IP in this case (for example, Real Time Protocol (RTP), for which, see RFC 1889.

By way of an alternative, the common data block may proceed to be hashed only when there is sufficient data for confidence to be ascribable or, for example, when the data is of a sufficiently well distributed nature as to allow reconstruction of intelligible speech.

As indicated above, although this embodiment of the invention has been described having regard to a packet voice conversation, the invention may be usefully applied to any other similar problem where data is exchanged and the data in common can then be established and a cryptographic signature performed as to provide an indication of identity.

What is claimed is:

1. A method of operating a terminal to provide non-repudiation in respect of data exchanged between the terminal and at least one other terminal, the data exchanged on a data exchange timescale via a link operable to provide a first link mode in which at least a portion of the exchanged data may be lost, the method comprising the steps of:
    (a) determining which data sent from the terminal was received at the other terminal;
    (b) indicating to the other terminal, which data sent from the other terminal was received at the terminal;
    (c) receiving a digital signature from the other terminal; and
    (d) in the event that the terminal determines that the digital signature was created utilizing a private cryptographic key associated with the other terminal and data comprising both the data determined to have been received at the other terminal and the data indicated to have been received at the terminal, establishing non-repudiation in respect of only the data determined to have been received at the other terminal and the data indicated to have been received at the terminal,
    wherein said method steps being carried out on a timescale different from the data exchange timescale.

2. A method as claimed in claim 1 wherein the terminal comprises a messaging element and a buffer; the buffer operable to receive data from the link, to buffer the received data and to pass all or a portion of the buffered data to the messaging element, wherein step (b) includes indicating to the other terminal, which data sent from the other terminal was received at the messaging element.

3. A method of operating a plurality of terminals to provide non-repudiation in respect of data exchanged between the plurality of terminals, said method comprising:
    each terminal performing the steps of claim 2 in respect of each other terminal.

4. A method as claimed in claim 1 wherein the link is further operable to provide a second link mode in which data is reliably exchanged, wherein steps (a), (b) and (c) comprise:
    receiving a first message from the other terminal sent via the second link mode, the first message indicating which data sent from the terminal was received at the other terminal;
    sending a second message to the other terminal via the second link mode, the second message indicating which data sent from the other terminal was received at the terminal; and
    receiving a third message from the other terminal via the second link mode, the third message including a digital signature.

5. A method as claimed in claim 1 wherein the terminal performs the determination of step (d) by:
    performing a hash function on the data comprising both the determined data and the indicated data to create a first hash value;
    decrypting the digital signature with a public cryptographic key associated with the other terminal to obtain a second hash value; and
    in the event that the first hash value and the second hash value are identical, determining that the digital signature was created utilizing a private cryptographic key associated with the other terminal and data comprising both the determined data and the indicated data.

6. A method of operating a pair of terminals to provide non-repudiation in respect of data exchanged between the pair of terminals comprising each terminal performing the steps of claim 1.

7. A method of providing non-repudiation in respect of a datastream exchanged between at least two terminals comprising the steps of repeating the steps of claim 1 in respect of successive portions of the datastream.

8. A method of creating an archive of non-repudiable data comprising performing the steps of claim 1 and storing the non-repudiable data then produced in an archive.

9. A computer readable storage medium, said medium embodying computer readable code for reading into a computer and executable by said computer to perform the method of claim 1.

10. A method as claimed in claim 1 wherein said method steps are further carried out in parallel with the data exchange timescale.

11. A method of operating a cryptographic element, said cryptographic element operable in combination with a first messaging element, said first messaging element sending data unreliably to a second messaging element and said second messaging element sending data unreliably to said first messaging element, the unreliable sending being carried out on a data exchange timescale, said method comprising the steps of:

determining which data sent from said first messaging element was received at said second messaging element;

indicating to a second cryptographic element operable in combination with said second messaging element, which data sent from said second messaging element was received at said first messaging element;

receiving a digital signature from said second cryptographic element;

decrypting said digital signature utilizing a cryptographic key associated with said second cryptographic element; and determining whether said digital signature was created utilizing said cryptographic key and data comprising both said determined data received at the second messaging element and said indicated data received at the first messaging element so as to establish non-repudiation in respect of only the data determined to have been received at the other terminal and the data indicated to have been received at the terminal, wherein said method steps being carried out on a timescale different from the data exchange timescale.

12. A method as claimed in claim 11 wherein said method steps are further carried out in parallel with the data exchange timescale.

13. A terminal for providing non-repudiation in respect of data exchanged between the terminal and at least one other terminal, the data exchanged via a link operable to provide a first link mode in which at least a portion of the exchanged data may be lost, the data exchange being carried out on a data exchange timescale, said terminal comprising:

(a) means operable to determine which data sent from the terminal was received at the other terminal;

(b) means operable to indicate to the other terminal, which data sent from the other terminal was received at the terminal;

(c) means operable to receive a digital signature from the other terminal; and (d) means operable to establish non-repudiation in respect of only the data determined to have been received at the other terminal and the data indicated to have been received at the terminal and to establish non-repudiation on a timescale different from the data exchange timescale in the event that the terminal determines that the digital signature was created utilizing a private cryptographic key associated with the other terminal and data comprising both the determined data received at the other terminal and the indicated data received at the terminal.

14. A terminal as claimed in claim 13 wherein the means operable to establish non-repudiation are further configured to establish non-repudiation in parallel with the data exchange timescale.

\* \* \* \* \*